United States Patent
Yeh et al.

(10) Patent No.: US 7,707,365 B2
(45) Date of Patent: Apr. 27, 2010

(54) MEMORY ADDRESS MONITORING DEVICE AND MEMORY ADDRESS MONITORING METHOD

(75) Inventors: Tingkun Yeh, Shindian (TW); Amanda Chou, Shindian (TW)

(73) Assignee: Via Technologies, Inc., Shindian, Taipei (TW)

( * ) Notice: Subject to any disclaimer, the term of this patent is extended or adjusted under 35 U.S.C. 154(b) by 329 days.

(21) Appl. No.: 11/330,222

(22) Filed: Jan. 12, 2006

(65) Prior Publication Data

US 2006/0165124 A1    Jul. 27, 2006

(51) Int. Cl.
*G06F 12/14* (2006.01)

(52) U.S. Cl. .................... 711/154; 711/E12.101
(58) Field of Classification Search .............. None
See application file for complete search history.

(56) References Cited

U.S. PATENT DOCUMENTS 4,814,982 A * 3/1989 Weir .................. 711/164
2003/0018860 A1 * 1/2003 Krueger ................ 711/152

* cited by examiner

*Primary Examiner*—Reginald G Bragdon
*Assistant Examiner*—Eric Loonan
(74) *Attorney, Agent, or Firm*—Birch, Stewart, Kolasch & Birch LLP (57) ABSTRACT

A memory address monitoring device for monitoring a memory includes an address determining module and an identification determining module. A first process has a first process identification and issues a request address to access the memory. The memory saves data of a second process between a beginning address and an ending address of the memory. The second process has a second process identification. In this device, the address determining module receives the request address and determines whether the request address is located between the beginning address and the ending address to generate an address determining result. The identification determining module receives the address determining result, the first process identification and the second process identification, and compares the first process identification with the second process identification to generate an identification determining result when the address determining result is true.

15 Claims, 9 Drawing Sheets

Firmware program codes of address determining module 22

⋮
if ((request address 412>beginning address 212) and (request address 412<ending address 213)) then
    address determining result 221 = true
else
    address determining result 221 = false
⋮

Firmware program codes of identification determining module 23

⋮
if (address determining result 221 and (executing process identification 411<>second process identification 421) then
    identification determining result 231=executing process identification 411
else
    identification determining result 231=0
⋮

MEMORY ADDRESS MONITORING DEVICE AND MEMORY ADDRESS MONITORING METHOD

BACKGROUND OF THE INVENTION

1. Field of Invention

The invention relates to an address monitoring device and an address monitoring method, and, in particular, to a memory address monitoring device capable of monitoring the condition when a processing circuit accesses a memory, and an address monitoring method.

2. Related Art

With the progress of the semiconductor manufacturing process, various types of chips, such as a processor, a controller or a memory, have higher and higher working frequencies, and many circuits may be integrated in one chip such that the working ability of the chip can be enhanced. In a digital data system, the data processing efficiency can be enhanced according to the working clock of the chip, such as that of the processor or the controller, and also can be enhanced through a multi-task mode.

A digital video/audio player, for example, receives digital video/audio data from an optical drive, a network or a wired/wireless television. Next, the digital video/audio player performs the process of variable length decode (VLD), inverse scan, inverse discrete cosine transform (IDCT) or inverse discrete wavelet transform (IDWT), inverse quantization, motion compensation or television encode on the digital video/audio data, such that the complete video/audio can be correctly played. These processes can be implemented by a program code or a circuit, or performed in a multi-task mode simultaneously. When these processes are being executed, the digital video/audio player allocates an independent memory sector to each process such that data can be saved and used in each process. In addition, these processes can be implemented by firmware or hardware in the same processing circuit, or in different independent processing circuits.

Figure 1:
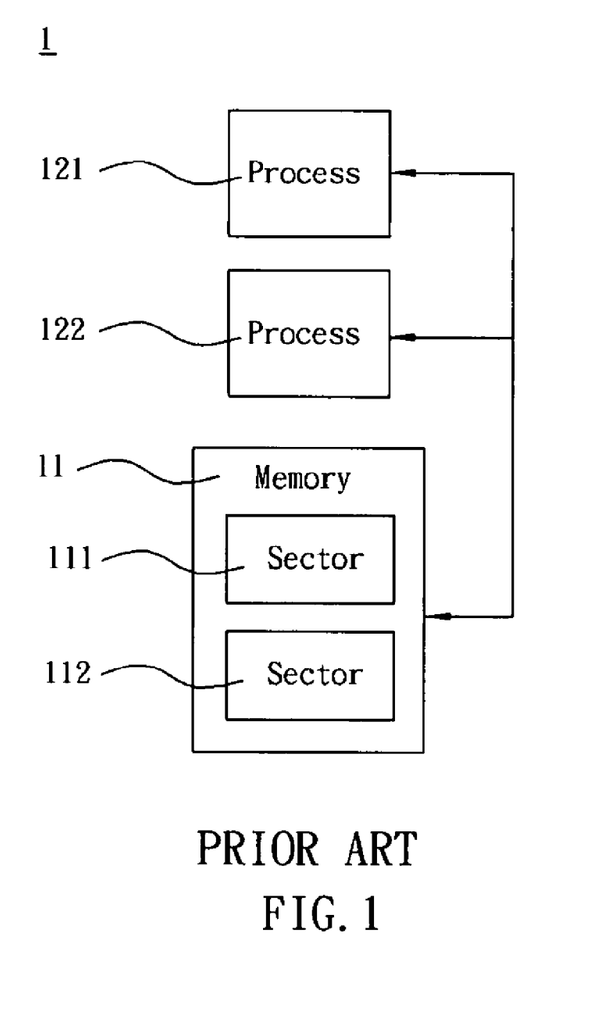
FIG. 1 is a schematic illustration showing a memory in a digital video player according to the prior art.

As shown in FIG. 1, in a memory 11 of a conventional digital video/audio player 1, sectors 111 and 112 are allocated to processes 121 and 122 for usage, respectively, and data for the processes 121 and 122 are saved in the sectors 111 and 112. When the process 121 is being executed, the video/audio data is stored in the sector 111. At this time, if the process 121 wrongly writes the data in the sector 112, the process 122 provides the wrong data, and the digital video/audio player may finally play the wrong frame.

In order to avoid the above-mentioned condition, the developer has to develop the processes 121 and 122, to debug strictly in the testing phase, and to monitor the reading state of the memory, such that the wrong procedure can be found, the occurrence of the above-mentioned condition can be decreased, and the digital video/audio player can correctly play the video.

SUMMARY OF THE INVENTION

In view of the foregoing, the invention is to provide a memory address monitoring device capable of monitoring the condition when a processing circuit accesses a memory, and a memory address monitoring method thereof.

To achieve the above, a memory address monitoring device of the invention is used for monitoring a memory with a beginning address and an ending address. A first process has a first process identification and issues a request address to access the memory. Data of a second process is saved between the beginning address and the ending address. The second process has a second process identification. The memory address monitoring device includes an address determining module and an identification determining module. The address determining module receives the request address and determines whether the request address is located between the beginning address and the ending address to generate an address determining result. The identification determining module receives the address determining result, the first process identification and the second process identification, and compares the first process identification with the second process identification to generate an identification determining result when the address determining result is true.

To achieve the above, the invention also discloses a memory address monitoring device for monitoring a memory with a beginning address and an ending address. A first process has a first process identification and issues a request address to access the memory. Data of a second process is saved between the beginning address and the ending address. The second process has a second process identification. The memory address monitoring device includes a first masking module, a second masking module, an address determining module and an identification determining module. The first masking module receives the request address and a first masking address and masks the request address with the first masking address to generate a first determining result. The second masking module receives the request address and a second masking address and masks the request address with the second masking address to generate a second determining result. The address determining module receives the first determining result and the second determining result and generates an address determining result. The identification determining module receives the address determining result, the first process identification and the second process identification, determines whether the request address falls between the beginning address and the ending address according to the address determining result, and thus compares the first process identification with the second process identification to generate an identification determining result.

To achieve the above, the invention also discloses a memory address monitoring method for monitoring a memory accessed by a first process. The first process has a first process identification and issues a request address to access the memory. Data of a second process is saved between a beginning address and an ending address of the memory. The second process has a second process identification. The memory address monitoring method is as follows. In this case, an address determining module receives the request address and determines whether the request address is between the beginning address and the ending address to generate an address determining result. An identification determining module receives the address determining result, the first process identification and the second process identification, and compares the first process identification with the second process identification to generate an identification determining result when the address determining result is true.

As mentioned above, the memory address monitoring device and method according to the invention determine whether the request address is between a beginning address and an ending address, and compare the first process identification with the second process identification. So, it is possible to monitor the accessed condition of the memory, to check whether the process correctly accesses the data in the memory, to find out the process with the access error for the developer to debug, and thus to speed up the product development.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2:
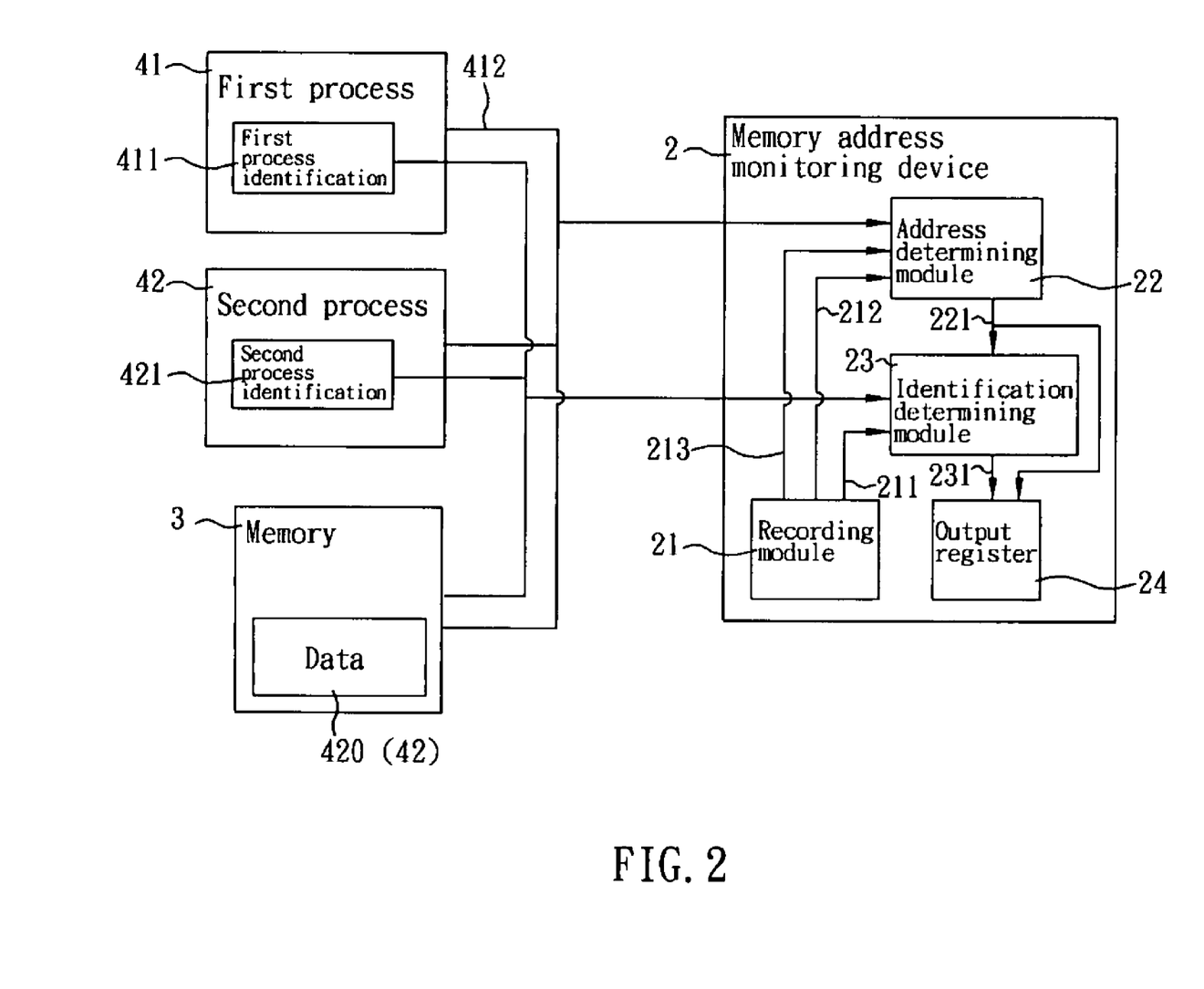
FIG. 2 is a block diagram showing a memory address monitoring device according to a first embodiment of the invention.

Referring to FIG. 2, a memory address monitoring device 2 according to a first embodiment of the invention monitors conditions when a first process 41 and a second process 42 access a memory 3. The first process 41 has a first process identification 411, and the second process 42 has a second process identification 421.

Figure 3:
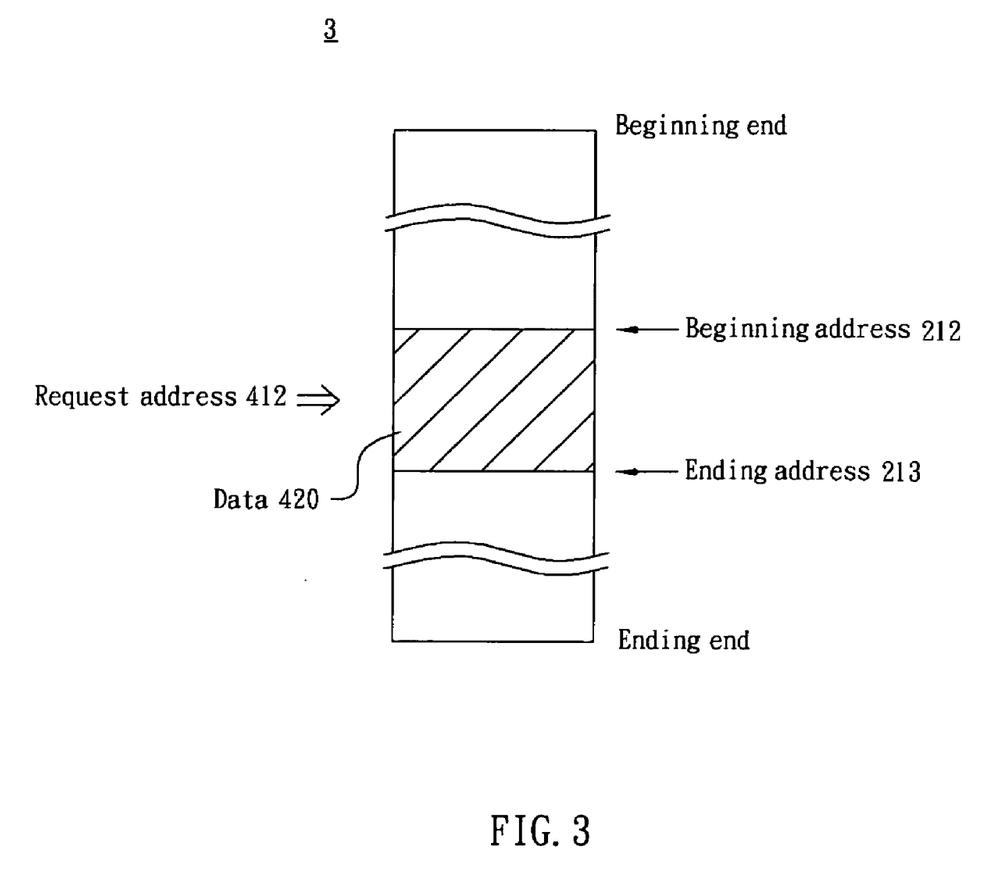
FIG. 3 is a schematic illustration showing a condition when a processor accesses the memory in the memory address monitoring device according to the first embodiment of the invention.

In addition, data 420 of the second process 42 is saved between a beginning address 212 and an ending address 213 of the memory 3, as shown in FIG. 3.

Referring again to FIG. 2, the memory address monitoring device 2 of this embodiment includes a recording module 21, an address determining module 22, an identification determining module 23.

The recording module 21 records the second process identification 421 of the second process 42, the beginning address 212, and the ending address 213.

In addition, when the first process 41 outputs a request address 412 to access the memory 3, as shown in FIG. 2, the address determining module 22 of this embodiment receives the request address 412, the beginning address 212 and the ending address 213, and determines whether the request address 412 is located between the beginning address 212 and the ending address 213 to generate an address determining result 221.

As shown in FIG. 2, when the address determining result 221 is true, the identification determining module 23 compares the first process identification 411 with the second process identification 211 to generate an identification determining result 231. Herein, the address determining result 221 and the identification determining result 231 may be saved in an output register 24.

Figure 4:
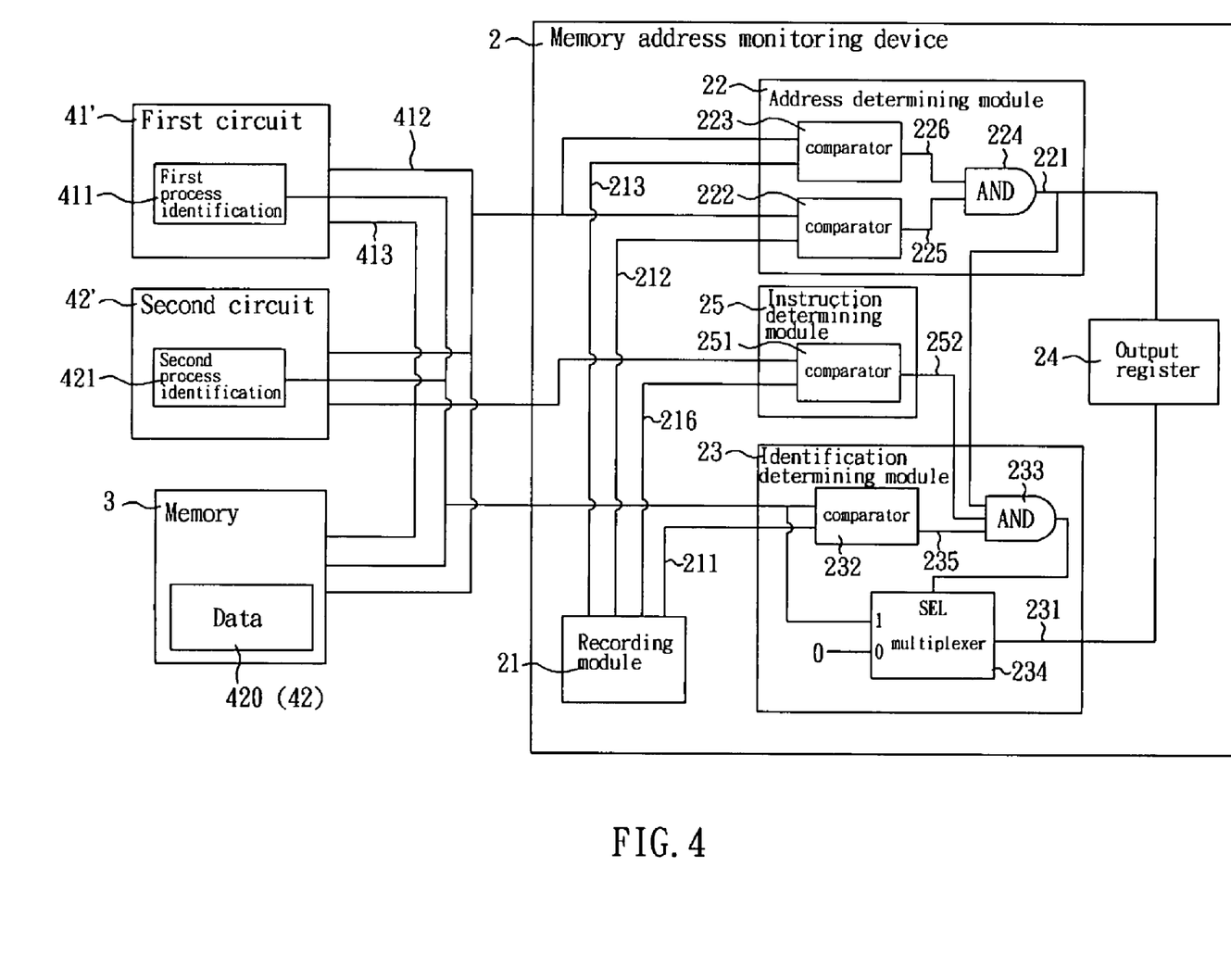
FIG. 4 is another block diagram showing another memory address monitoring device according to the first embodiment of the invention.

In addition, as shown in FIG. 4, the memory address monitoring device 2 further includes an instruction determining module 25 for determining what kind of accessing operation will be performed in the memory 3.

In this embodiment, the recording module 21 may be a register, and the address determining module 22 includes two comparators 222, 223 and an AND gate 224. In addition, the identification determining module 23 includes a comparator 232, an AND gate 233 and a multiplexer 234.

In addition, the memory address monitoring device 2 in this embodiment monitors the conditions when processes (e.g., the first process 41 and the second process 42) access the memory 3 in a digital video/audio player, such that the developer can debug the first process 41 and the second process 42 through the memory address monitoring device 2.

Herein, the first process 41 and the second process 42 may be implemented as a first circuit 41' and a second circuit 42', respectively. In this case, the first circuit 41' and the second circuit 42' may be processing circuits capable of performing the process of variable length decode (VLD), inverse scan, inverse discrete cosine transform (IDCT) or inverse discrete wavelet transform (IDWT), inverse quantization, motion compensation or television encode.

In order to make the feature of this embodiment more obvious, several aspects of the embodiment will be described.

As shown in FIG. 4, when the first circuit 41' outputs the first process identification 411, the request address 412 and an access instruction 413 to access the memory 3, a comparator 222 of the address determining module 22 compares whether the request address 412 is higher than the beginning address 212 and thus generates a first address comparing result 225. A comparator 223 of the address determining module 22 compares whether the request address 412 is smaller than the ending address 213 and thus generates a second address comparing result 226.

Next, the AND gate 224 of the address determining module 22 performs an AND operation on the first address comparing result 225 and the second address comparing result 226 to generate an address determining result 221. When the first address comparing result 225 and the second address comparing result 226 are true, the address determining result 221 is also true. That is, the data sector for saving the second process 42 in the memory 3 is accessed.

Then, a comparator 251 of the instruction determining module 25 receives the access instruction 413 and compares to determine whether the access instruction 413 is the same as a code 216 for a write-in instruction and thus outputs a write-in determining result 252. The code 216 can be saved in the recording module 21. When the request address 412 is a write-in data address and the write-in determining result 252 outputted from the comparator 251 is also true, the first circuit 41' can write the data in the memory 3.

Next, the comparator 232 of the identification determining module 23 compares to determine whether a first process identification 411 and the second process identification 211 are the same to generate an identification comparing result 235. The AND gate 233 performs an AND operation on the address determining result 221, the write-in determining result 252 and the identification comparing result 235 in order to control the multiplexer 234 to choose the first process identification 411 or 0 and thus to output the identification determining result 231. When the address determining result 221 is true and the identification comparing result 235 is false, the identification determining result 231 is generated according to the first process identification 411.

In addition, if the second circuit 42' outputs the request address to write data in the memory 3, all of the address determining result 221, the write-in determining result 252 and the identification comparing result 235 are true after being processed by this method. Thus, the identification determining result 231 is 0.

As mentioned hereinabove, the developer can observe the identification determining result 231 as 0 to determine whether the sector of the memory 3 allocated to the second circuit 42' is written by other circuits. Consequently, the developer can hold the access state of the memory 3 and find out the time instantly when an access error occurs in the first process 41. Thus, the program code or circuit of the first process 41 can be corrected such that the first process 41 and the second process 42 can be debugged and tested more easily.

Figure 5:
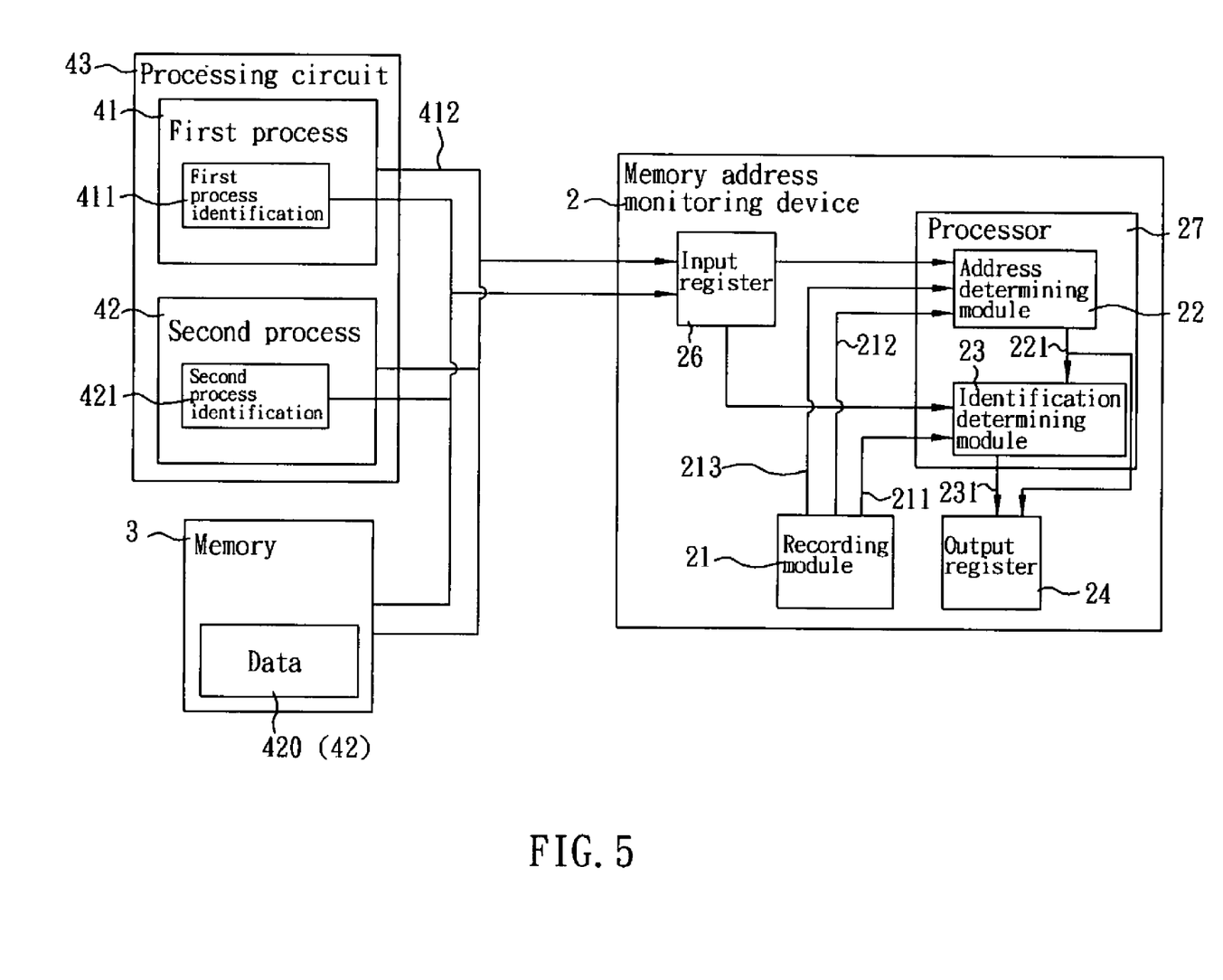
FIG. 5 is still another block diagram showing still another memory address monitoring device according to the first embodiment of the invention.

Furthermore, refer to FIG. 5, which is different from FIG. 2, showing a memory address monitoring device 2 further including an input register 26 and a processor 27.

Figure 6:
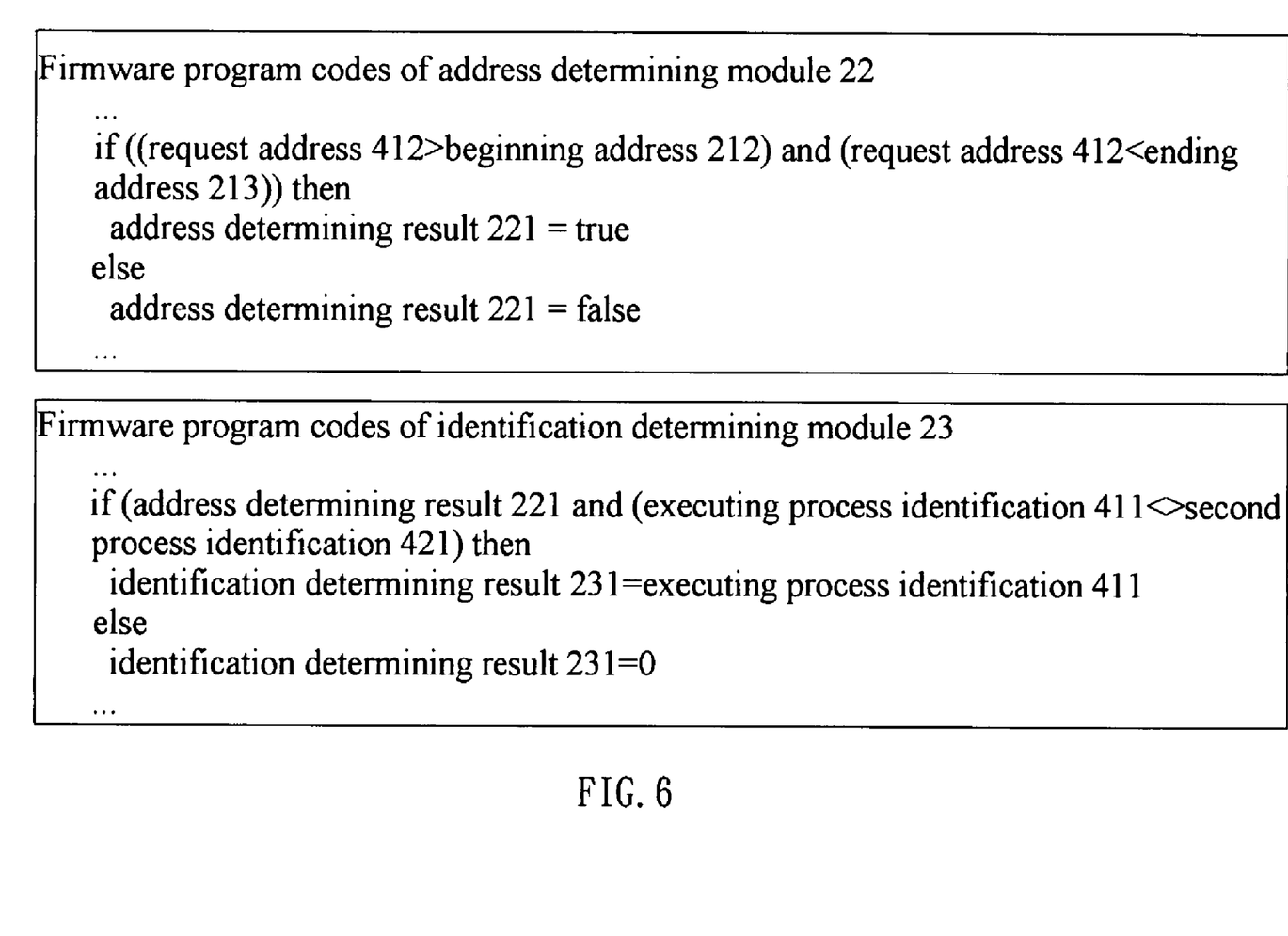
FIG. 6 is a schematic illustration showing firmware program codes of the address determining module and the identification determining module in the memory address monitoring device according to the first embodiment of the invention.

In addition, the recording module 21 in FIG. 5 may be a register, and the address determining module 22 and the identification determining module 23 may be implemented by program codes, which are shown in FIG. 6 and executed in the processor 27. Furthermore, the first process 41 and the second process 42 are implemented by a first program code and a second program code, respectively, as shown in FIG. 6.

Referring again to FIGS. 5 and 6, a processing circuit 43 alternately executes a first program code 41 and a second program code 42 in a multi-task mode. When the processing circuit 43 executes the first program code and outputs the request address 412 to access the memory 3, the input register 26 receives and saves the request address 412 and the identification 411. Next, the processor 27 executes the address determining module 22 and the identification determining module 23 and saves the address determining result 221 and the identification determining result 231 in the output register 24.

As mentioned hereinabove, the developer can observe the address determining result 221 and the identification determining result 231 in the output register 24 to know whether the sector of the memory 3 allocated to the second process 42 is accessed by the first program code 41.

Please refer again to FIGS. 7 and 8, which show another aspect of this embodiment. Herein, a memory address monitoring device 5 includes a recording module 51, a first masking module 52, a second masking module 53, an address determining module 54, an identification determining module 55 and an output register 56. The memory address monitoring device 5 monitors the condition when the first process 41 accesses the memory 3.

Figure 7:
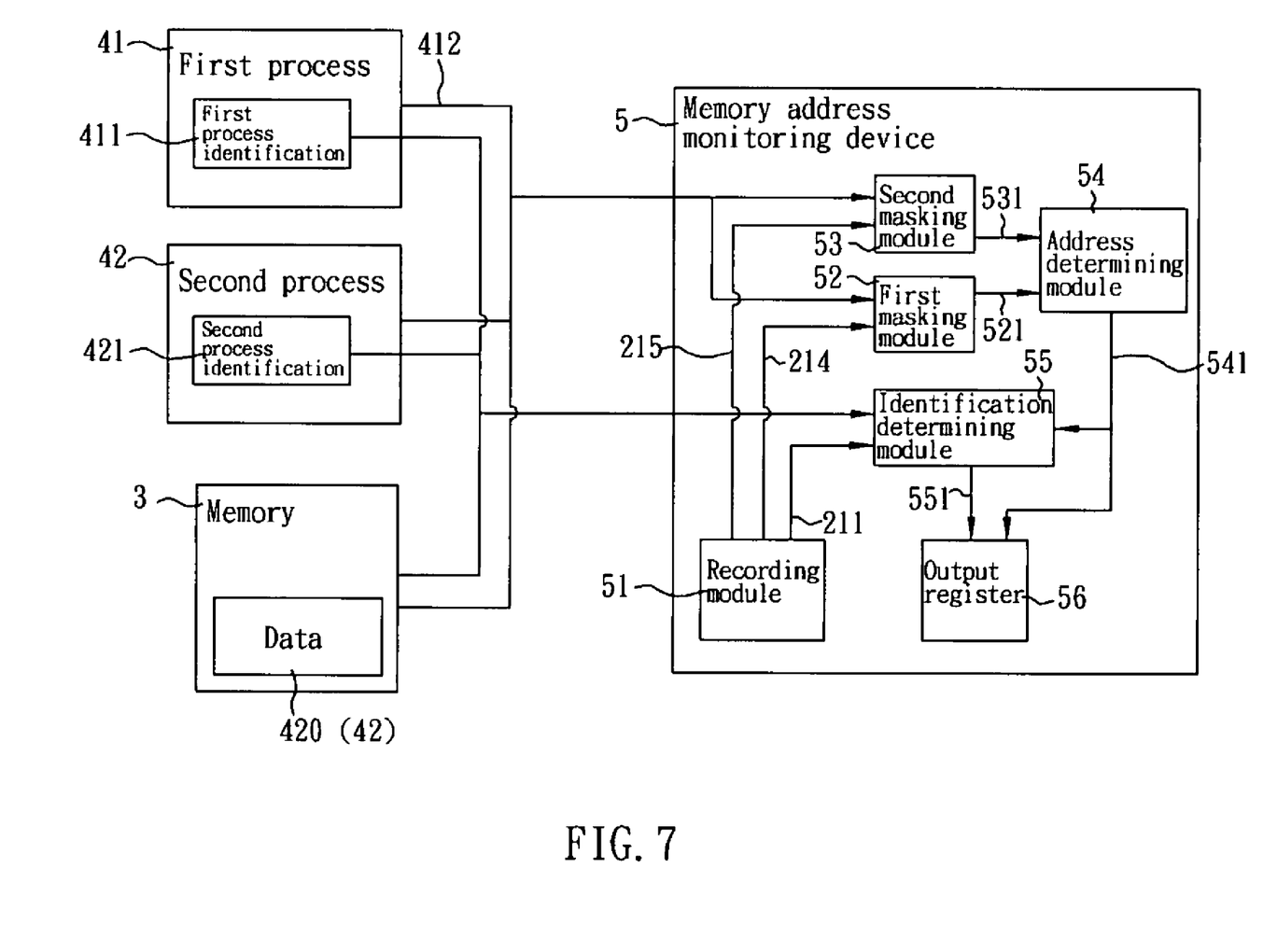
FIG. 7 is a block diagram showing the memory address monitoring device according to the first embodiment of the invention.
Figure 8:
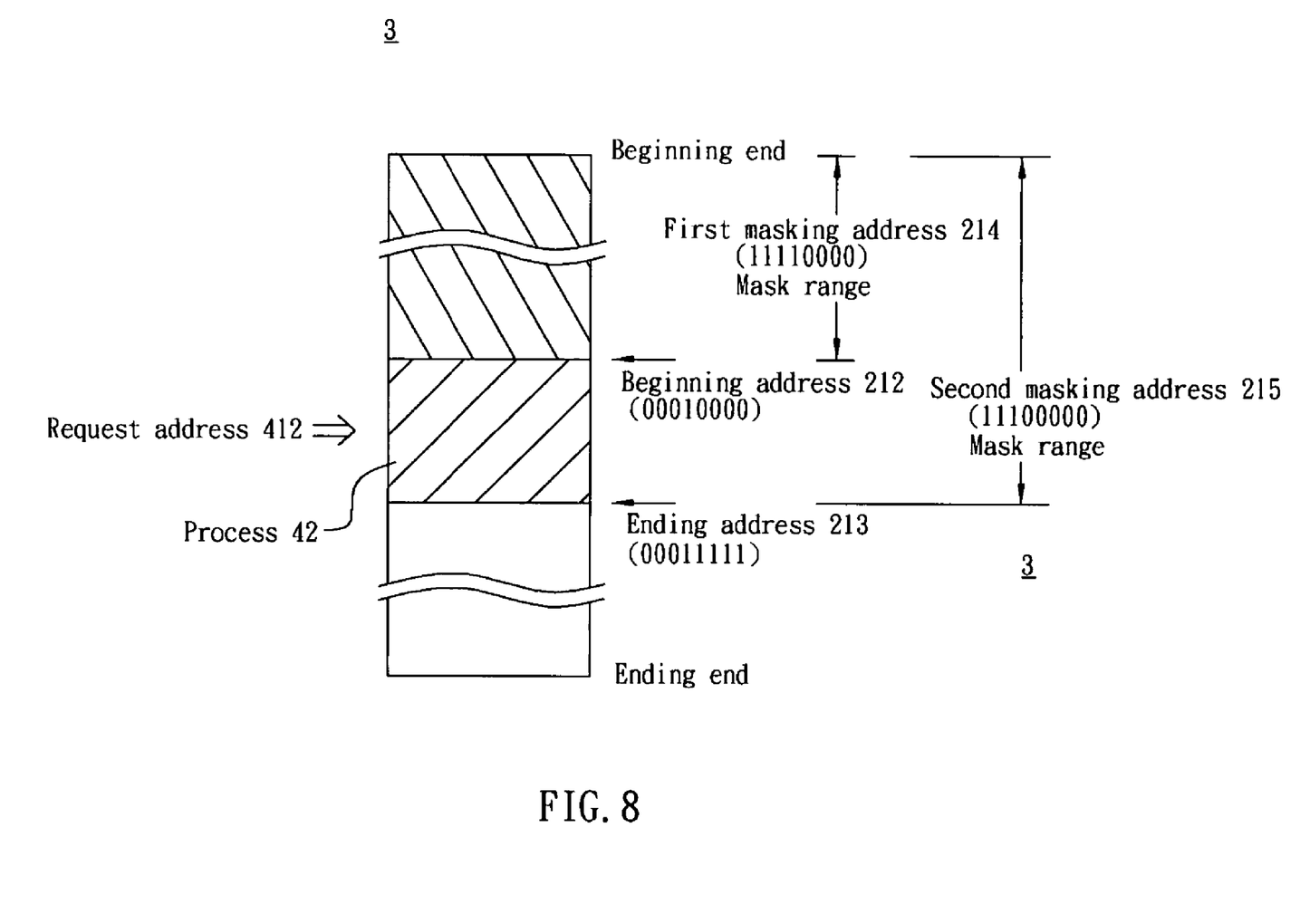
FIG. 8 is a schematic illustration showing a condition when the processor accesses the memory in the memory address monitoring device according to the first embodiment of the invention.

In this aspect of this embodiment, the recording module 51 records the second process identification 211 of the second process 42, a first masking address 214 and a second masking address 215. The data 420 of the second process 42 is saved between the beginning address 212 and the ending address 213 of the memory 3, and the first masking address 214 and the second masking address 215 are generated according to the beginning address 212 and the ending address 213, respectively.

As shown in FIG. 7, the first masking module 52 receives the request address 412 and the first masking address 214, and masks the request address 412 with the first masking address 214 to generate a first determining result 521. In addition, the second masking module 53 receives the request address 412 and the second masking address 215 and masks the request address 412 with the second masking address 215 to generate a second determining result 531.

Next, the address determining module 54 receives the first determining result 521 and the second determining result 531 to generate an address determining result 541. Then, the identification determining module 55 receives the first determining result 521, the second determining result 531, the first process identification 411 and the second process identification 211, determines whether the request address 412 falls between the beginning address 212 and the ending address 213 according to the first determining result 521 and the second determining result 531, and thus compares the first process identification 411 with the second process identification 421 to generate an identification determining result 551.

Figure 9:
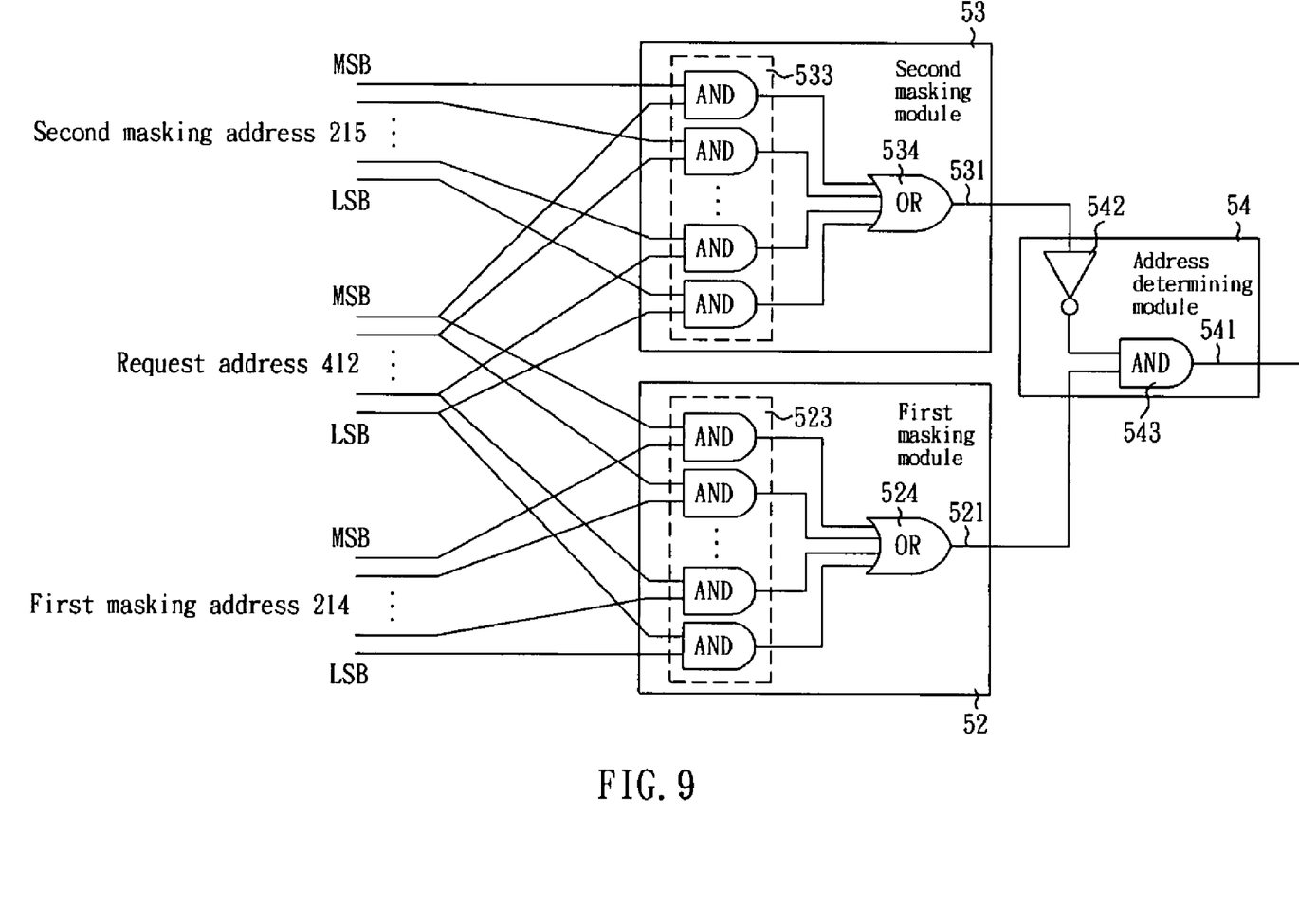
FIG. 9 is yet another block diagram showing yet another memory address monitoring device according to the first embodiment of the invention.

FIG. 9 is yet another block diagram showing yet another memory address monitoring device according to the first embodiment of the invention.

Herein, the first masking module 52 includes an AND gate array 523 and an OR gate 524, and the second masking module 53 includes an AND array 533 and an OR gate 534. In addition, the address determining module 54 includes a NOT gate 542 and an AND gate 543.

Referring again to FIG. 8, the mask bit number of the first masking address 214 is smaller than the mask bit number of the second masking address 215 because the beginning address 212 is lower than the ending address 213. In the first masking address 214 and the second masking address 215, the mask bit is set as 0 and the non-mask bit is set as 1.

As shown in FIGS. 7 and 9, when the first process 41 outputs the request address 412 to access the memory 3, the AND array 523 performs a bitwise AND operation on each bit of the first masking address 214 and the request address 412, the AND array 523 outputs the operation result of each bit to the input terminal of the OR gate 524, and the OR gate 524 outputs the first determining result 521 at its output terminal. In addition, the AND array 533 performs the bitwise AND operation on each bit of the second masking address 215 and the request address 412, the AND array 533 and outputs the operation result of each bit to the input terminal of the OR gate 534. The OR gate 534 outputs the second determining result 531 at the output terminal thereof. Then, the NOT gate 542 reverses the second determining result 531 and inputs the reversed result to the input terminal of the AND gate 543, and the first determining result 521 is also inputted to the input terminal of the AND gate 543. Then, the AND gate 543 performs the AND operation on the first determining result 521 and the reversed result and thus outputs the address determining result 541.

If the request address 412 is between the beginning address 212 and the ending end of the memory 3, the first determining result 521 is 1. On the contrary, if the request address 412 is between the beginning end of the memory 3 and the ending address 213, the second determining result 531 is 0. That is, when the request address 412 is between the beginning address 212 and the ending address 213, the first determining result 521 is 1 and the second determining result 531 is 0, and the address determining result 541 outputted from the AND gate 543 is 1.

For example, if the beginning address 212 and the ending address 213 are 00010000 and 00011111, respectively, and the leftmost bit 1 in the beginning address 212 is located at the fourth bit on the left-hand side of the most significant bit (MSB), then the first to fourth bits on the right-hand side of the MSB of the first masking address 214 are set as 1 and the other bits are set as 0, such that the first masking address 214 is set as 11110000. Adding 1 to the ending address 213 gets the added result of 00010000. The leftmost bit 1 of the added result for the ending address 213 added by 1 is located at the third bit on the right-hand side of the MSB. The first to third bits on the right-hand side of the MSB of the second masking address 215 are set as 1 and the other bits are set as 0, such that the second masking address 215 is set as 11100000.

When the request address 412 is 00010011, the first determining result 521 is 1 after the first masking module 52 performs the bitwise AND operation on each bit of the first masking address 214 and the request address 412. Then, the second determining result 531 is 0 and the address determining result 541 is thus 1 after the second masking module 53 performs the bitwise AND operation on each bit of the second masking address 215 and the request address 412. At this time, the identification determining module 55 compares the executing (first process) process identification 411 with the second process identification 211 to generate the identification determining result 551. The address determining result 541 and the identification determining result 551 may be saved in the output register 56 such that the developer can monitor them easily.

The maximum difference between two aspects of the first embodiment of the invention is that the methods of determining whether the request address 412 falls between the beginning address 212 and the ending address 213 are different. The first aspect processes and determines the request address 412 using comparison operators (>, <), while the second aspect processes and determines the request address 412 using logic operators (AND, OR). Although the two aspects are different, the identification determining module 55 and the identification determining module 23 have the same effect, object and result. So, detailed descriptions thereof will be omitted.

In addition, a memory address monitoring method according to a second embodiment of the invention monitors a memory. A first process has a first process identification and issues a request address to access the memory. Data of a second process is saved between a beginning address and an ending address of the memory, and the second process has a second process identification. The memory address monitoring method, which cooperates with the above mentioned memory address monitoring device, includes the steps as follows. In this case, the address determining module receives the request address and determines whether the request address is located between the beginning address and the ending address to generate an address determining result. The identification determining module receives the address determining result, the first process identification and the second process identification, and compares the first process identification with the second process identification to generate an identification determining result when the address determining result is true.

Because the memory address monitoring method may be implemented in the memory address monitoring device according to the first and second aspects of the first embodiment, detailed implementation steps have been described and discussed in the first embodiment and will be omitted.

In either first embodiment (including various aspects) or the second embodiment of the invention, the first process 41 and the second process 42 may be implemented by program codes or hardware circuits, and may be implemented in individually independent circuits or the same circuit with the program codes. Thus, the aspects of the first process 41 and the second process 42 should not be considered as limited to the specific aspects of the embodiments.

In addition, each of the first process 41 and the second process 42 may be a digital processor, a controller, a video encoder/decoder or a television encoder. The first process 41, the second process 42 and the memory 3 may be applied to a video player. When the first process 41 wrongly accesses the memory 3, the developer can monitor the used condition of the memory 3 through the memory address monitoring device 2 and can trace the problem process, such that the video player can play the video normally.

In summary, the memory address monitoring device and method according to the invention determine whether the request address is located between a beginning address and an ending address, and compare the first process identification with the second process identification. So, it is possible to monitor the accessed condition of the memory, to check whether the process correctly accesses the data in the memory, to find out the process with the access error for the developer to debug, and thus to speed up the product development.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A memory address monitoring device for monitoring a memory with a beginning address and an ending address, wherein a first process has a first process identification and issues a request address and an access instruction to access the memory, data of a second process is saved between the beginning address and the ending address, the second process has a second process identification, the memory address monitoring device comprising:

an address determining module for receiving the request address and determining whether the request address is located between the beginning address and the ending address to generate an address determining result;

an instruction determining module for determining whether the access instruction is the same as a code for a write-in instruction to output a write-in determining result; and an identification determining module for processing the address determining result, the write-in determining result, the first process identification and the second process identification to generate an identification determining result, wherein the identification determining module further comprising:

a comparator for determining whether the first process identification and the second process identification are the same to generate an identification comparing result;

an AND gate for performing an AND operation on the address determining result, the write-in determining result and the identification comparing result; and a multiplexer for choosing the first process identification or zero according to the output of the AND gate and outputting the identification determining result, wherein the multiplexer outputs the identification determining result according to the first process identification when the address determining result is true and the identification comparing result is false, and wherein the first process, the second process, and the memory are implement in a video player.

2. The device according to claim 1, wherein the address determining module determines whether the request address is greater than the beginning address and smaller than the ending address to generate the address determining result.

3. The device according to claim 1, further comprising: a recording module for recording the second process identification of the second process, the beginning address and the ending address.

4. A memory address monitoring device for monitoring a memory with a beginning address and an ending address, wherein a first process has a first process identification and issues a request address and an access instruction to access the memory, data of a second process is saved between the beginning address and the ending address, and the second process has a second process identification, the memory address monitoring device comprising:
   a first masking module for receiving the request address and a first masking address, and masking the request address with the first masking address to generate a first determining result;
   a second masking module for receiving the request address and a second masking address and masking the request address with the second masking address to generate a second determining result;
   an address determining module for receiving the first determining result and the second determining result and generating an address determining result;
   an instruction determining module for determining whether the access instruction is the same as a code for a write-in instruction to output a write-in determining result; and
   an identification determining module for processing the address determining result, the write-in determining result, the first process identification and the second process identification to generate an identification determining result,
   wherein the identification determining module further comprising:
   a comparator for determining whether the first process identification and the second process identification are the same to generate an identification comparing result;
   an AND gate for performing an AND operation on the address determining result, the write-in determining result and the identification comparing result; and
   a multiplexer for choosing the first process identification or zero according to the output of the AND gate and outputting the identification determining result,
   wherein the multiplexer outputs the identification determining result according to the first process identification when the address determining result is true and the identification comparing result is false, and
   wherein the memory is implemented in a video player.

5. The device according to claim 4, wherein a mask bit number of the first masking address is smaller than a mask bit number of the second masking address, the first masking address is generated according to the beginning address, and the second masking address is generated according to the ending address.

6. The device according to claim 4, wherein the first masking module performs a bitwise AND operation on the first masking address and the request address to generate a first masking result, and performs an inter-bit OR operation on the first masking result to generate the first determining result.

7. The device according to claim 4, wherein the second masking module performs a bitwise AND operation on the second masking address and the request address to generate a second masking result, and performs an inter-bit OR operation on the second masking result to generate the second determining result.

8. The device according to claim 4, further comprising: a recording module for recording the second process identification of the second process, a first masking address and a second masking address, wherein the first masking address and the second masking address are generated according to the beginning address and the ending address, respectively.

9. The device according to claim 4, wherein when the first determining result is true and the second determining result is false, the request address falls between the beginning address and the ending address, and the comparator compares the first process identification with the second process identification to generate the identification determining result.

10. A memory address monitoring method for monitoring a memory accessed by a first process, wherein the first process has a first process identification and issues a request address and an access instruction to access the memory, data of a second process are saved between a beginning address and an ending address of the memory, and the second process has a second process identification, the memory address monitoring method comprising the steps of:
   determining whether the request address is between the beginning address and the ending address to generate an address determining result;
   determining whether the access instruction is the same as a code for a write-in instruction to output a write-in determining result;
   determining whether the first process identification and the second process identification are the same to generate an identification comparing result;
   performing an AND operation on the address determining result, the write-in determining result and the identification comparing result; and
   choosing the first process identification or zero as an identification determining result according to a result of the AND operation and outputting the identification determining result.

11. The method according to claim 10, wherein when the request address determining step is to determine whether the request address is greater than the beginning address and smaller than the ending address to generate the address determining result.

12. The method according to claim 10, wherein the first process, the second process, and the memory are implemented in a video player.

13. The method according to claim 10, wherein the request address determining step comprises:
   generating a first masking address and a second masking address according to the beginning address and the ending address;
   masking the request address with the first masking address and the second masking address to generate a first determining result and a second determining result, respectively; and
   determining whether the request address falls between the beginning address and the ending address according to the first determining result and the second determining result to generate the address determining result.

14. The method according to claim 13, wherein a mask bit number of the first masking address is smaller than a mask bit number of the second masking address.

15. The method according to claim 13, wherein the masking step is to perform a bitwise AND operation on the first masking address and the request address to generate a first masking result, to perform an inter-bit OR operation on the first masking result to generate the first determining result, to perform a bitwise AND operation on the second masking address and the request address to generate a second masking result, and to perform an inter-bit OR operation on the second masking result to generate the second determining result.

* * * * *